United States Patent
van Klooster

(10) Patent No.: US 9,506,788 B2
(45) Date of Patent: Nov. 29, 2016

(54) ULTRASONIC FLOWMETER HAVING A TRANSDUCER HOUSING WITH AN ULTRASOUND WINDOW WHICH IS MOUNTED IN A TRANSDUCER POCKET, AND A SHIELDING FOR PROTECTING THE ULTRASONIC SIGNAL PATH FROM THE EFFECTS OF VORTICES GENERATED BY THE TRANSDUCER POCKET

(71) Applicant: Krohne AG, Basel (CH)

(72) Inventor: Jeroen Martin van Klooster, Tiel (NL)

(73) Assignee: Krohne AG, Basel (CH)

( * ) Notice: Subject to any disclaimer, the term of this patent is extended or adjusted under 35 U.S.C. 154(b) by 53 days.

(21) Appl. No.: 14/524,125

(22) Filed: Oct. 27, 2014

(65) Prior Publication Data

US 2015/0114134 A1    Apr. 30, 2015

(30) Foreign Application Priority Data

| Oct. 30, 2013 | (DE) | ......................... 10 2013 018 187 |
| Feb. 21, 2014 | (DE) | ......................... 10 2014 002 223 |
| Apr. 2, 2014 | (DE) | ......................... 10 2014 004 747 |

(51) Int. Cl.
| *G01F 1/66* | (2006.01) |
| *G01F 1/32* | (2006.01) |
| *G10K 11/00* | (2006.01) |

(52) U.S. Cl.
CPC .............. *G01F 1/66* (2013.01); *G01F 1/3209* (2013.01); *G01F 1/662* (2013.01); *G10K 11/002* (2013.01)

(58) Field of Classification Search
None
See application file for complete search history.

(56) References Cited

U.S. PATENT DOCUMENTS

| 4,173,889 | A |   | 11/1979 | Forster et al. |
| 4,467,659 | A | * | 8/1984 | Baumoel ................. G01F 1/662 310/366 |
| 4,646,575 | A |   | 3/1987 | O'Hair et al. |
| 4,783,997 | A | * | 11/1988 | Lynnworth ............... B06B 3/00 73/644 |
| 5,179,862 | A | * | 1/1993 | Lynnworth ............. G01F 1/662 73/861.28 |
| 5,289,436 | A | * | 2/1994 | Terhune ............. G01N 29/2462 181/400 |
| 5,467,321 | A | * | 11/1995 | Baumoel .................. G01F 1/66 367/140 |
| 5,515,733 | A | * | 5/1996 | Lynnworth ............. G01F 1/662 73/644 |
| 6,189,389 | B1 |   | 2/2001 | van Bekkum et al. |
| 6,748,811 | B1 |   | 6/2004 | Iwanaga et al. |
| 2003/0055340 | A1 |   | 3/2003 | Van Klooster |
| 2005/0139013 | A1 |   | 6/2005 | Hashimoto et al. |

FOREIGN PATENT DOCUMENTS

| EP | 0249689 A1 | 12/1987 |
| JP | S6326537 A | 2/1988 |
| WO | 2012/084392 A1 | 6/2012 |

* cited by examiner

*Primary Examiner* — Harshad R Patel
(74) *Attorney, Agent, or Firm* — David S. Safran

(57) ABSTRACT

An ultrasonic flowmeter for measuring the flow of a flowing medium (1) having a measuring tube (2) and an ultrasonic transducer (3), wherein the measuring tube (2) has a transducer pocket (4) in which the ultrasonic transducer (3) is provided in contact with the flowing medium (1) in the transducer pocket (4). The ultrasonic transducer (3) has a transducer housing (5) and a transducer element (6) and wherein the transducer housing (5) has an ultrasound window (8). The ultrasonic flowmeter solves problems resulting from vortices generated by the transducer pocket via the provision of a cylindrical shielding on the transducer housing (5).

18 Claims, 3 Drawing Sheets

ULTRASONIC FLOWMETER HAVING A TRANSDUCER HOUSING WITH AN ULTRASOUND WINDOW WHICH IS MOUNTED IN A TRANSDUCER POCKET, AND A SHIELDING FOR PROTECTING THE ULTRASONIC SIGNAL PATH FROM THE EFFECTS OF VORTICES GENERATED BY THE TRANSDUCER POCKET

BACKGROUND OF THE INVENTION

1. Field of the Invention

The invention relates to an ultrasonic flowmeter for measuring the flow of a flowing medium having a measuring tube and having an ultrasonic transducer, wherein the measuring tube has a transducer pocket, wherein the ultrasonic transducer is provided having contact to the flowing medium in the transducer pocket of the measuring tube and has a transducer housing and a transducer element and wherein the transducer housing has an ultrasound window.

2. Description of Related Art

The ultrasonic flowmeter described above is a normal ultrasonic flowmeter insofar as it has a measuring tube and an ultrasonic transducer. In the following, however, an ultrasonic flowmeter should also be understood as one that does not have a separate measuring tube, but instead the measuring tube is an integral part of a pipe, for example, a piping system having a medium, whose flow is to be measured, flowing through it.

The use of ultrasonic flowmeters has gained increasingly in importance over time in operational measurement of flow of liquids and gases, summarized as flowing media. Flow measurement with the help of ultrasonic flowmeters is carried out as in, for example, magnetic-inductive flowmeters "without contact", i.e., without interfering installations, which result in vortices and an increased loss in pressure.

In ultrasonic flowmeters, the method of measurement is differentiated primarily between the Doppler method and the running time method, and in the running time method, there are the direct running time method, the pulse repetition frequency method and the phase shift method (see H. Berard "Ultraschall-Durchflussmessung" in "Sensoren, Messaufnehmer", published by Bonfig/Bartz/Wolff in expert verlag, as well as the VDI/VDE guideline 2642 "Ultraschall-Durchflussmessung von Flüssigkeiten in voll durchströmten Rohrleitungen").

A measuring tube, which generally represents the measuring section, having an inlet section and an outlet section, on the one hand, and on the other hand, at least one ultrasonic transducer, which is sometimes called measuring head, are essential for operation of ultrasonic flowmeters of the type being discussed. An ultrasonic transducer is to be understood in a general sense here. Ultrasonic transmitters, i.e., measuring heads for generating and emitting ultrasonic signals, on the one hand, and on the other hand, ultrasonic receivers, i.e., measuring heads for receiving ultrasonic signals and for converting the received ultrasonic signals into electric signals, are both parts of the ultrasonic transducers. However, measuring heads that combine an ultrasonic transmitter and an ultrasonic receiver in one, i.e., are used both for generating and transmitting ultrasonic signals as well as receiving ultrasonic signals and converting the received ultrasonic signals into electric signals, are also ultrasonic transducers.

An ultrasonic transducer of the type discussed last is installed in ultrasonic flowmeters that operate with only one ultrasonic transducer. Such ultrasonic flowmeters determine the velocity of the flowing medium with the help of the Doppler shift of an ultrasonic signal reflected on an inhomogeneity of the flowing medium. Likewise, it is possible that the Doppler shift of the ultrasonic signals can be determined via two ultrasonic transducers arranged without being offset on opposing sides of the measuring tube.

It is also possible to perform ultrasonic flow measurements that are based on the running time method and in which two ultrasonic transducers are used, arranged offset on the same side of the measuring tube in the direction of flow, wherein the ultrasonic signals are reflected on the side of the measuring tube opposite the ultrasonic transducers. However, two ultrasonic transducers are regularly provided that are arranged offset, opposite one another in the direction of flow.

It is stated above that a measuring tube and an ultrasonic transducer are parts of an ultrasonic flowmeter of the type being discussed here, that the measuring tube has a transducer pocket, and that the ultrasonic transducer is provided in contact with the flowing medium in the transducer pocket of the measuring tube. The invention relates, of course, also to an ultrasonic flowmeter having several ultrasonic transducers, in which the measuring tube consequently has several transducer pockets.

Transducer pocket in the scope of the invention means a recess or cavity, implemented in any sort of manner, located outside of the flow cross section of the measuring tube, in which the ultrasonic transducer is installed so that it does not extend into the flow cross section, or at least does not extend substantially into the flow cross section, i.e., does not influence or does not essentially influence the flow. When several ultrasonic transducers are provided offset and opposite one another in the direction of flow, then they are aligned in respect to one another. Generally, the longitudinal axis of the transducer pockets runs at an acute angle or an obtuse angle to the direction of flow of the flowing medium or to the longitudinal axis of the measuring tube (see image 6.1.1, page 532 of the citation "Sensoren, Messaufnehmer" l.c., image 8, page 18 of the VDI/VDE guideline 2642 l.c. and FIG. 2-2 on page 21 of the citation "Ultrasonic Measurements for Process Control" from Lawrence C. Lynnworth, ACADE-MIC PRESS, INC., published by Harcourt Brace Jovanovich).

There are also ultrasonic flowmeters in which the ultrasonic transducers do not come into contact with the flowing medium; i.e., are arranged on the outside of the measuring tube, so-called "clamp-on arrangement". The invention relates, however, only to ultrasonic flowmeters in which the ultrasonic transducers come into contact with the flowing medium.

The flow of the medium flowing in the measuring tube does not remain without influence by the transducer pocket, in fact vortices are generated in the flow by the transducer pockets. The examination of the formation and the description of the formation process of vortices is a current field of scientific research. Essentially, the forming of vortices can be described using the cavity resonance theory. This theory is summarized in the following.

Without limiting universality, the explanations are described using a cavity located on the measuring tube in the form of an open cube, wherein the open side faces toward the flow channel. These explanations, however, are applicable for all forms of transducer pockets. The cavity has five closed sides, namely a cavity floor and four side surfaces, wherein only two side surfaces, namely a first side surface perpendicular to the direction of flow and a second side surface perpendicular to the direction of flow, are relevant for the explanations, wherein the first side surface is located before the second side surface in respect to the direction of flow.

Phenomena or mechanisms that dominate in the forming of vortices are, on the one hand, so-called shear layer modes, and on the other hand, so-called wake modes. A free shear layer is described in general as the transition area between two parallel flows with different velocities. Shear layer modes are dependent of the length and the depth of the cavity, the Mach number, wherein the Mach number describes the ratio of the velocity of the medium to the speed of sound in the medium $M=U_\infty/c$, and the interface layer thickness $\delta$. The flow region close to the measuring tube wall is the interface layer, in which the forces of viscosity and the forces of inertia are in the same order of magnitude. Here, the section influenced by the forces of viscosity is designated as the interface layer thickness. The forming of the vortex caused by shear layer modes is described as follows:

A free shear layer is formed between the cavity and the "outer area" located in the measuring tube. This free shear layer is generally instable and has interferences. The interferences of the free shear layer encompassing the cavity strike the second side surface of the cavity, i.e., the back, side surface in respect to direction of flow. An acoustic pulse or an acoustic wave is generated by the stagnating pressure, which spreads upstream. This acoustic wave causes a pressure difference between the acoustic wave spreading below the shear layer and the acoustic wave continuously spreading above the shear layer. This pressure difference influences the shear layer in such a manner that further interferences occur in the shear layer, the shear layer "rolls up" and a vortex is formed that spreads downstream. This vortex moving downstream strikes, in turn, the second side surface of the cavity. Thus, the feedback chain for exciting and maintaining the system is closed and further vortices are formed. A flow state dominated by periodic unsteady pressure fluctuations is thus formed.

The cavity resonance frequency for rectangular cavities can be determined using an empirical formula developed by Rossiter. It is $$St_n = \frac{f_n L}{U_\infty} = \frac{n - \alpha}{M + 1/\kappa}$$

Here, $St_n$ is the Strouhal number, $f_n$ is the vortex shedding frequency, L is the length of the cavity, $U_\infty$ is the velocity of flow, $\alpha$ is a factor that gives the temporal delay between the occurrence of a shear layer interference and the emission or kindling of an acoustic wave/an acoustic pulse at the second side surface of the cavity, $\kappa$ is the ratio between the vortex convection velocity and the free flow velocity of the medium and M is the Mach number.

It can be seen using the described formula that the Strouhal number $St_n$ is dependent on the Mach number M. However, it has been seen in experiments that there are also cases in which the Strouhal number $St_n$ is quasi constant, thus nearly independent of the Mach number M. This leads to the assumption that the mechanism for forming a vortex based on shear layers modes cannot be the only one, but that a further mechanism has to exist that is based on purely hydrodynamic instability phenomena. This further mechanism is described by so-called wake modes. Wake modes occur mainly at high Reynold's numbers. The vortices formed by the mechanism have a lower shedding frequency than vortices caused by shear layer modes. Wake modes are characterized by strong unsteady flow with chaotic behavior caused by the interaction being clearly more pronounced between the free shear layer and the cavity flow.

As a solution for the problem described above, that results from vortices generated from transducer pockets, it has already been suggested to fill the transducer pocket with plastic (see, FIG. 4-9 on page 257 of the citation "Ultrasonic Measurements for Process Control", l.c.). However, the same disadvantages arise as in ultrasonic flowmeters based on the Snell's law, in which the ultrasonic transducer is attached to the outside of the measuring tube, i.e., in a so-called "clamp-on arrangement". Additionally, there are problems with the acoustic impedance and problems with the plastic filled into the transducer pockets, in particular at high temperatures. The disadvantages and problems associated with filling the transducer pockets with plastic are why this embodiment was not established in practice.

Professionals in the field have already dealt with the problems resulting from the vortices generated due to transducer pockets. Here, reference is made to German Patent DE 196 48 784 C2 which corresponds to U.S. Pat. Nos. 6,189,389 B1, 6,748,811 B1 and International Patent application Publication WO 2012 084392 A1. Ultrasonic flowmeters are known from German Patent DE 196 48 784 C2, U.S. Pat. Nos. 6,189,389 B1 and 6,748,811 B1, in which the transducer pocket is provided with a mesh grating. Another embodiment is shown in International Patent application Publication WO 2012 084392 A1, namely one in which a baffle plate is inserted perpendicular to the ultrasound window of the ultrasonic transducer in front of the ultrasound window of the ultrasonic transducer in the transducer pocket of the measuring tube.

SUMMARY OF THE INVENTION

Based on the described prior art and the described problems resulting from the vortices generated by the transducer pocket, the object of the invention is to provide an ultrasonic flowmeter, in which problems resulting from the vortices generated by the transducer pocket are better solved than in the prior art.

The ultrasonic flowmeter according to the invention in which the above derived and described object is met, is initially and essentially wherein a cylindrical shielding is provided that is preferably designed in a tube shape. In detail, the cylindrical, preferably tube-shaped, shielding is implemented so that, on the one hand, the forming of vortices along the measuring section, or respectively, the influence of the vortices on the measurements is reduced, and on the other hand, the ultrasonic signal, or respectively, the propagation path of the ultrasonic signal is not or at least not substantially influenced or impaired. The idea forming the basis of the invention is not to prevent the forming of vortices at the transducer pocket, but to shield the propagation path of the ultrasonic signal from the resulting vortices, wherein the influence of the shielding on the acoustic behavior of the ultrasonic transducer should be negligible.

Particular embodiments of ultrasonic transducers of the ultrasonic flowmeters according to the invention will be described below in conjunction with embodiments represented in drawings. It is noted here that it is possible that, in particular situations, depending on the present geometry and the operating frequency of the ultrasonic transducer, the shielding itself provided according to the invention begins to vibrate. If these vibrations become too strong, it is possible that the shielding interferes with the signals generated by the ultrasonic transducer, and thus, influences the ultrasonic signals. In order to avoid this problem, particular measures are provided according to the invention, which cause a decoupling of the ultrasonic transducer from the cylindrical shielding. Reference is also made insofar to what will be described below in conjunction with the embodiments represented in the drawings.

In detail there are numerous possibilities for designing and further developing the ultrasonic flowmeter according to the invention as will become apparent from the following description in conjunction with the accompanying drawings.

DETAILED DESCRIPTION OF THE INVENTION

Figure 1:
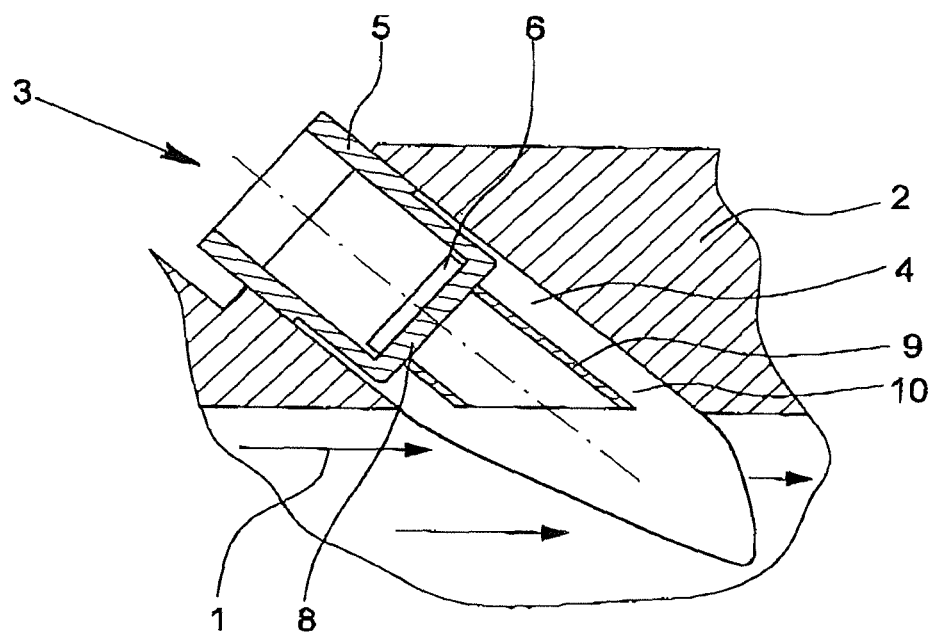
FIG. 1 is a cross-sectional view of an embodiment of a portion of an ultrasonic flowmeter according to the invention having a first embodiment of the ultrasonic transducer according to the invention.

A measuring tube 2 and an ultrasonic transducer 3 of the ultrasonic flowmeter shown in FIG. 1 for measuring the flow of a flowing medium 1. The measuring tube 2 has a transducer pocket 4. The ultrasonic transducer 3 is arranged in the transducer pocket 4 of the measuring tube 2 so as to be in contact with the flowing medium 1. The ultrasonic transducer 3 has a transducer housing 5 and a transducer element 6. The transducer housing 5 has an ultrasound window 8 on a front end 7 that faces into the measuring tube 2.

According to the invention, a shielding 9 is provided, the purpose, impact and design of which being described in the following.

Figure 2:
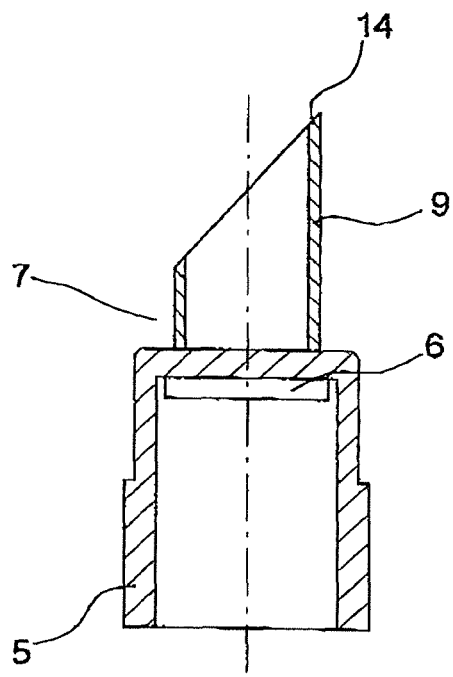
FIG. 2 is a cross-sectional side view of the ultrasonic transducer of the ultrasonic flowmeter according to FIG. 1
Figure 3:
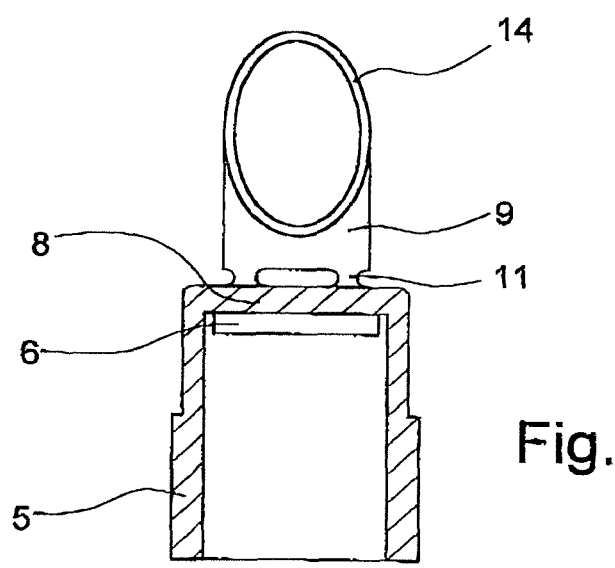
FIG. 3 is a partial sectional view of a second embodiment of an ultrasonic transducer of an ultrasonic flowmeter according to the invention.

As seen in FIGS. 1-3, the shielding 9 is provided on the front end 7 of the transducer housing 5 facing the inside of the measuring tube 2, specifically on the ultrasound window 8 of the transducer housing 5, in the embodiments shown in these figures of the ultrasonic transducers 3 belonging to the ultrasonic flowmeters according to the invention. Additionally, it is valid for these embodiments that the shielding 9 is permanently fixed to the transducer housing 5, or respectively, to the ultrasound window 8 of the transducer housing 5. The "permanent fixing" of the shielding 9 to the transducer housing 5, or respectively the ultrasound window 8 of the transducer housing 5 can also be implemented by the shielding 9 and the transducer housing 5, or respectively, the ultrasound window 8 of the transducer housing 5, being integrally formed.

Figure 4:
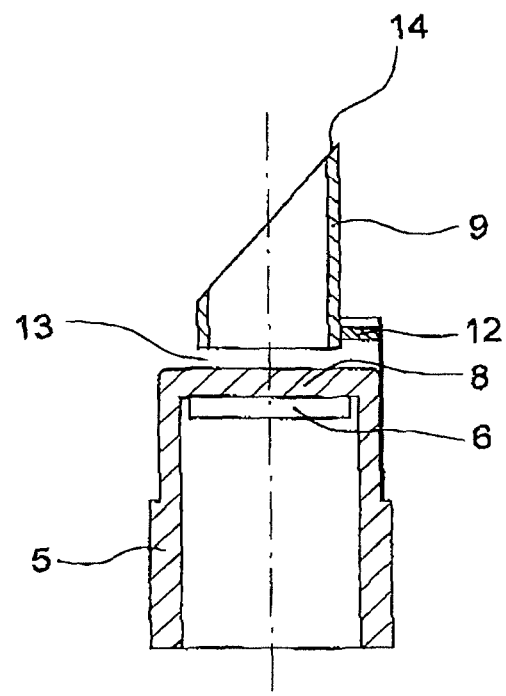
FIG. 4 is view similar to the of FIG. 2, but showing a third embodiment of an ultrasonic transducer belonging to an ultrasonic flowmeter according to the invention.

In the embodiment of an ultrasonic transducer 3 of an ultrasonic flowmeter according to the invention, shown in FIG. 4, the shielding 9 is, to some extent, elastically joined to the transducer housing 5; this could also be implemented as an elastic connection of the shielding 9 to the ultrasound window 8 of the transducer housing 5.

Figure 5:
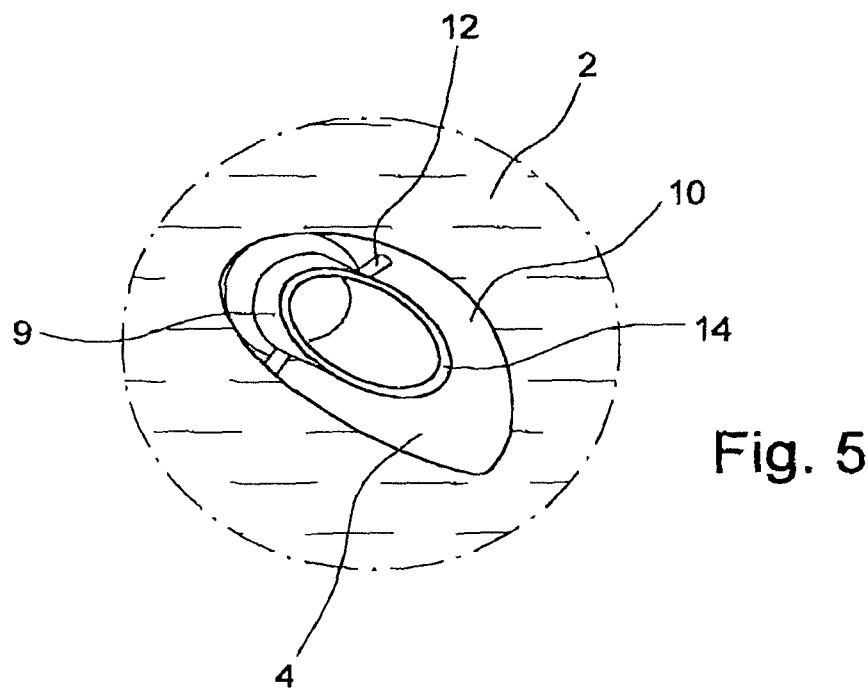
FIG. 5 is an end view of a fourth embodiment of an ultrasonic transducer of an ultrasonic flowmeter according to the invention.

It is shown only in FIGS. 1 & 5 that a cavity 10 remains between the shielding 9 and the transducer pocket 4, when the ultrasonic transducer 3 is installed in the transducer pocket 4.

FIG. 3, on the one hand, as well as FIGS. 4 & 5, on the other hand, show particular embodiments of ultrasonic transducers 3 of the ultrasonic flowmeters according to the invention. In the embodiment according to FIG. 3, recesses 11 are provided at the foot of the shielding 9, i.e., at the location where the shielding 9 is joined to the ultrasound window 8 of the transducer housing 5. In contrast, for the embodiment shown in FIG. 4, the shielding 9 is joined to the transducer housing 5 by at least one fastening element 12; however, a connection of the shielding 9 to the ultrasonic window 8 of the transducer housing 5 by means of a fastening element is also possible.

In all of the embodiments shown in the figures, in the ultrasonic transducers 3 of the ultrasonic flowmeters according to the invention, the shielding 9 is connected to the ultrasonic window 8 of the transducer housing 5 (FIGS. 1-3) or to the transducer housing 5 (FIGS. 4 & 5). However, it is also possible for the shielding 9 to also be connected to the inside wall of the transducer pocket 4 of the measuring tube 2 by at least one fastening element 12 as is shown in FIG. 5.

It was mentioned above that the shielding 9 can be permanently fixed to the transducer housing 5 or to the ultrasound window 8 of the transducer housing 5, however, an elastic connection of the shielding 9 to the transducer housing 5 or the ultrasound window 8 of the transducer housing 5 is also possible. Between a "fixed connection" and an "elastic connection", the transition is "fluent." While the shielding 9 is connected "particularly fixedly" to the ultrasound window 8 of the transducer housing 5 in the embodiments according to FIGS. 1 & 2, the shielding 9 is connected "particularly elastically" to the transducer housing 5 in FIG. 4; a free space 13 is implemented between the shielding 9 and the ultrasound window 8 of the transducer housing 5 in this case. The embodiment according to FIG. 3 has a certain degree of elasticity due to recesses 11 being provided at the foot of the shielding 9, i.e., at the location where the shielding 9 is connected to the ultrasound window 8 of the transducer housing 5, a degree of elasticity is created that is between the "particularly fixed" connection between the shielding 9 and the ultrasound window 8 of the transducer housing 5 according to FIGS. 1 & 2 and the "particularly elastic" connection of the shielding 9 to the transducer housing 5 according to FIG. 4.

A correct interpretation of the ultrasonic transducers 3 belonging to the ultrasonic flowmeters according to the invention shown in all figures leads easily to the result that the shielding 9 has a small wall thickness, i.e., a wall thickness that relatively small in comparison to the internal diameter of the shielding 9.

Additionally, FIGS. 1-4 show that, in ultrasonic transducers 3 of ultrasonic flowmeters according to the invention, the shielding 9 is configured axially symmetrically in respect to the ultrasound window 8 of the transducer housing 5 and FIGS. 1, 2 and 4 show that the shielding 9 has a flat front end 14 on its end away from the transducer housing 5 or the ultrasound window 8 of the transducer housing 5. However, it is also possible to provide the shielding 9 with a front face that is not flat on its end away from the transducer housing or the ultrasound window of the transducer housing, in particular with a front face that corresponds to the curve of the measuring tube in the area of the transducer pocket.

Still to be noted is that, for all embodiments shown in the figures, the outer diameter of the shielding 9 is less than the inner diameter of the transducer pocket 4 so that the shielding 9 does not extend (or only minimally extends) into the flowing medium 1 and that the shielding 9 can be formed of metal, in particular of stainless steel, or a metal alloy, plastic or ceramic.

In ultrasonic flowmeters according to the invention, the cylindrical, preferably tube-shaped, shielding 9, described in detail above, is implemented in such a manner that, on the one hand, the formation of vortices along the measuring section or the influence of the vortices on measurement is reduced, however, on the other hand, the ultrasonic signal or the propagation path of the ultrasonic signal is not or is not substantially influenced or impaired.

What is claimed is:

1. Ultrasonic flowmeter for measuring the flow of a flowing medium, comprising:
   a measuring tube having a transducer pocket by which vortices are generated in the flow,
   an ultrasonic transducer provided in the transducer pocket in a manner enabling contact with the flowing medium flowing in an inner space of the measuring tube, the ultrasonic transducer having a transducer housing with an ultrasound window and a transducer element, and
   a cylindrical shielding that has a tubular shape and is mounted on a front end of the transducer housing extending toward the inner space of the measuring tube and located so as to shield a propagation path of an ultrasonic signal from the vortices generated by the transducer pocket so that the propagation path of the ultrasonic signal is at least not substantially influenced or impaired by the vortices.

2. Ultrasonic flowmeter according to claim 1, wherein the shielding is provided on a front end of the transducer housing directed axially toward the inner space of the measuring tube.

3. Ultrasonic flowmeter according to claim 2, wherein the shielding is provided on the ultrasound window of the transducer housing.

4. Ultrasonic flowmeter according to claim 2, wherein the shielding is permanently fixed to the transducer housing.

5. Ultrasonic flowmeter according to claim 4, wherein the shielding and the transducer housing are integrally formed.

6. Ultrasonic flowmeter according to claim 2, wherein the transducer housing and the shielding are oriented at an acute angle in a direction of medium flow through the measuring tube, and wherein an end of the shielding directed toward the flow is beveled so that the end is essentially parallel to the direction of medium flow.

7. Ultrasonic flowmeter according to claim 1, wherein the shielding is elastically connected to the transducer housing.

8. Ultrasonic flowmeter according to claim 7, wherein the elastic connection is implemented by recesses provided where the shielding is connected to the transducer housing.

9. Ultrasonic flowmeter according to claim 1, wherein the shielding is joined to the transducer housing by at least one fastening element.

10. Ultrasonic flowmeter according to claim 1, wherein the shielding is connected to a wall of the transducer pocket.

11. Ultrasonic flowmeter according to claim 1, wherein the shielding has a relatively thin wall thickness as compared to its inner diameter.

12. Ultrasonic flowmeter according to claim 1, wherein the shielding is arranged axially symmetric to the ultrasound window of the transducer housing.

13. Ultrasonic flowmeter according to claim 1, wherein the shielding has a flat front surface on an end opposite the transducer housing.

14. Ultrasonic flowmeter according to claim 1, wherein the shielding has a curved front surface on an end opposite the transducer housing.

15. Ultrasonic flowmeter according to claim 1, wherein an outer diameter of the shielding is less than an inner diameter of the transducer pocket.

16. Ultrasonic flowmeter according to claim 1, wherein the shielding extends at most insignificantly into the inner space of the measuring tube to an extent to enabling a propagation path of the ultrasonic signal to be shielded from the resulting vortices while preventing the shielding from appreciably influencing acoustic behavior of the ultrasonic transducer.

17. Ultrasonic flowmeter according to claim 1, wherein the shielding is formed of a metal, a metal alloy, plastic or a ceramic.

18. Ultrasonic flowmeter according to claim 1, wherein the shielding is formed of stainless steel.

\* \* \* \* \*